Aug. 18, 1925. 1,549,952
E. C. ANDERSON
DEVICE FOR CLEANING GEAR CASINGS OF AUTOMOBILES
Filed Dec. 13, 1923 2 Sheets-Sheet 1
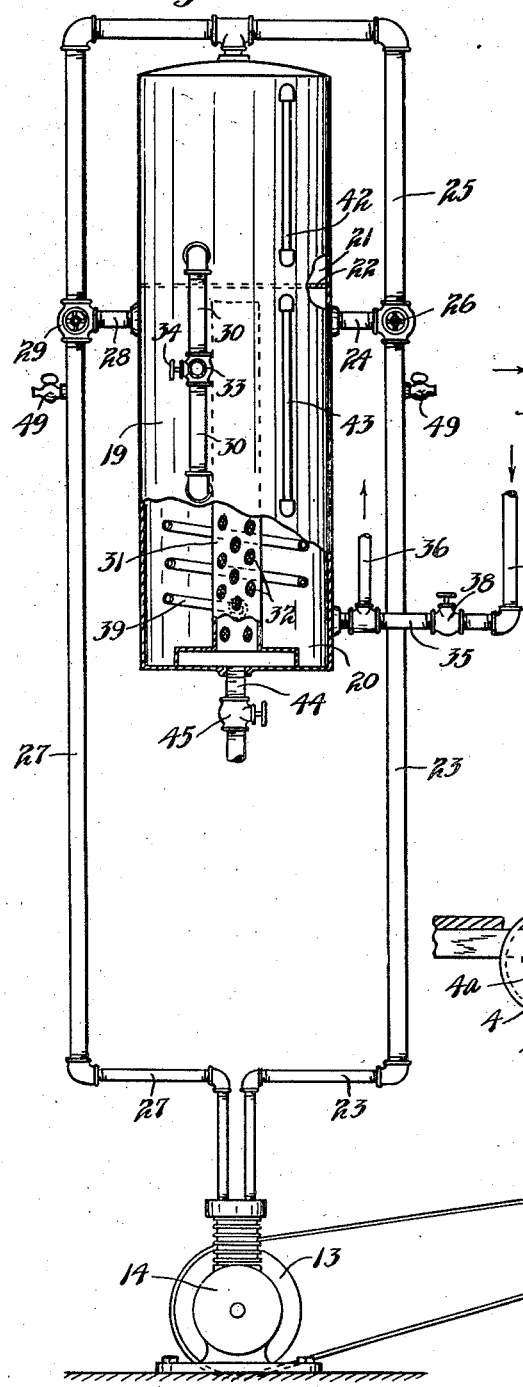
INVENTOR.
EDWIN C. ANDERSON.
BY HIS ATTORNEY.
James F. Williamson Aug. 18, 1925.
E. C. ANDERSON
1,549,952
DEVICE FOR CLEANING GEAR CASINGS OF AUTOMOBILES
Filed Dec. 13, 1923   2 Sheets-Sheet 2
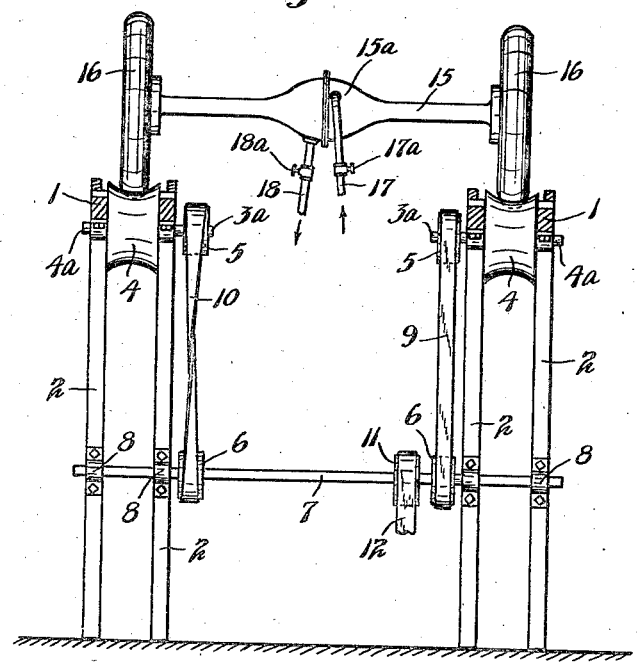
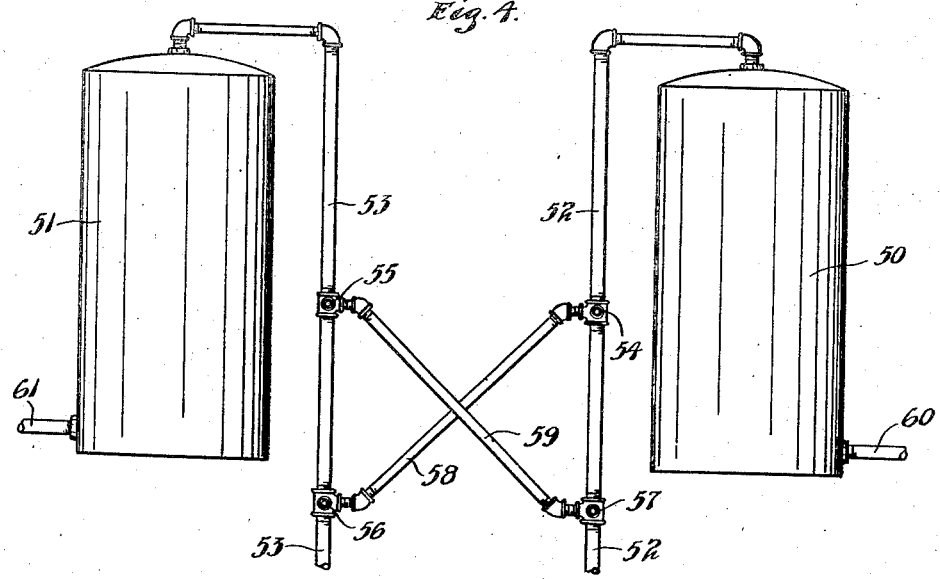
INVENTOR.
EDWIN C. ANDERSON.
BY HIS ATTORNEY
James F. Williamson Patented Aug. 18, 1925.

1,549,952

UNITED STATES PATENT OFFICE.

EDWIN C. ANDERSON, OF MINNEAPOLIS, MINNESOTA.

DEVICE FOR CLEANING GEAR CASINGS OF AUTOMOBILES.

Application filed December 13, 1923. Serial No. 680,561.

*To all whom it may concern:*

Be it known that I, EDWIN C. ANDERSON, a citizen of the United States, residing at Minneapolis, in the county of Hennepin and State of Minnesota, have invented certain new and useful Improvements in Devices for Cleaning Gear Casings of Automobiles; and I do hereby declare the following to be a full, clear, and exact description of the invention, such as will enable others skilled in the art to which it appertains to make and use the same.

This invention relates to an apparatus for cleaning gear casings and particularly to such a device designed to clean the gear casings of automobiles. As is well known, the differential casing which is usually in the rear axle housing, and the universal joint casings are filled with grease. This grease often becomes hardened after a certain period and it is desirable to clean the casing well before a new charge of grease is placed therein. It is a difficult and long operation to disassemble the casing to clean the same.

It is an object of this invention to provide a simple and efficient device, by means of which the gear casing can be easily and very quickly cleaned without disassembling the same.

It is a further object of the invention to provide a device for cleaning the gear casing by forcing therethrough a cleaning fluid such as kerosene which, preferably, is heated.

It is still another object of the invention to provide such a device, by means of which a cleaning fluid is passed through the gear casing, and which is driven from the automobile so that the parts within the gear casing are moving while the cleaning is being effected.

It is still another object of the invention to provide a device adapted to forcibly circulate a cleaning fluid through the gear casing which is driven from a mechanism on which one or more of the automobile wheels rest, which mechanism is operated by friction from the driven automobile wheel.

It is a further object of the invention to provide such a device as above set forth, comprising a pressure and suction producing means in connection with two tanks or a tank having two compartments, the cleaning fluid being contained in one tank and placed under pressure so as to be forced through the gear casing and then drawn into the other tank or compartment by the suction produced, the device being capable of manipulation so that pressure can then be applied to the tank into which the cleaning fluid has been delivered and suction applied to the tank or compartment originally containing the cleaning fluid.

These and other objects and advantages of the invention will be fully set forth in the following description made in connection with the accompanying drawings in which like reference characters refer to the same parts throughout the different views, and in which, Fig. 1 is a view in elevation of the apparatus, a certain portion thereof being broken away and other parts shown in vertical section;

Fig. 2 is a view in side elevation of a portion of the apparatus, as seen from the right of Fig. 1;

Fig. 3 is a vertical section through a portion of the apparatus showing the rear axle housing and automobile wheels, together with conduits connected to the housing; and Fig. 4 is a view in side elevation of a modified form of apparatus.

Referring to the drawings, a platform or runway 1 is illustrated supported upon frames 2, which platform will be supported some distance above the ground and will be in the form of a ramp or incline at one end so that an automobile may readily be driven thereon. At certain points in the platform, concave rollers 3 and 4 are disposed so that the rear wheels of the automobile can be brought to rest thereon, as shown in Figs. 1 and 3. Said rollers are suitably secured on shafts 3ª and 4ª journaled in bearings carried by the frame 2. A pair of rollers 3 and 4 may be supplied at each side of the platform, as shown in Fig. 3, so that both rear wheels will rest upon such rollers. The said rollers are freely revoluble and the shafts 3ª of the rear roller 3 are equipped with pulleys 5, which pulleys are connected by suitable belts to pulleys 6 on a counter shaft 7 extending between frames 2 and journaled in suitable bearings 8 thereon. A brake device is provided for the rollers 3 and 4 and while this brake device may be of any desired type, in the embodiment of the invention illustrated, the same is shown as a wedge member 46 vertically movable upon a screw 47 supported in the platform 1, which wedge is adapted to be forced against said wheels by a nut and hand wheel member 48. If both sets of rollers are used, one of the rollers 3 will be connected to each pulley 6 by an open belt 9, while the other pulley 5 will be connected to the other pulley 6 by a cross belt 10. The shaft 7 carries a pulley 11 connected by a suitable belt 12 to the pulley 13 on an air compressor or air pump 14 which will be mounted upon any convenient support. The axle housing 15 of the automobile having the differential gear casing 15ª at the center thereof is shown, which housing carries the rear wheel 16. An inlet conduit 17 is connected to the gear casing 15ª while the outlet conduit 18 is also connected thereto at a substantially opposite point, said conduits 17 and 18 having valves 17ª and 18ª, respectively, adjacent their ends. The conduits 17 and 18 will be connected into suitably tapped holes in said gear casing. In some makes of automobiles these tapped holes are provided on the standard machine, while on others they can readily be made therein. A container 19 is supported upon a convenient frame, not shown, which container is provided with a lower tank or compartment 20 and an upper tank or compartment 21, said tanks or compartments having a dividing wall 22 therebetween. A conduit 23 forming the discharge conduit from the compressor 14 is connected to the tank 20 through the pipe 24, and pipe 25 suitably controlled by the three-way valve 26 also extends to and into the top of tank or compartment 21. Another conduit 27 forms the intake conduit to the compressor 14, is connected to the top of the tank 21 and is also adapted to be connected through a pipe 28 with the lower tank 20, said pipes 27 and 28 being controlled by the three-way valve 29. A pipe 30 communicates with the tank 21 and also with the tank 20. The end of pipe 30 communicating with the tank 20, extends into a cylindrical member 31 disposed in the tank 20 provided with a large number of apertures over which a screen 32 extends. The member 31 is shown in the form of a cylinder centrally disposed in tank 20 and provided with an enlarged base. Pipe 33 communicates with pipe 30 and is controlled by a suitable three-way valve 34. The pipe 33 is directly connected to conduit 18. The pipe 35 leads from tank 20 adjacent the bottom thereof to which is connected a pipe 36 which, in turn, is directly connected to conduit 17. Pipe 37 is also connected to pipe 35 and controlled by a suitable valve 38. A heating coil 39 is disposed in tank 20 and surrounds the member 31, said coil having an inlet portion 40 adapted to be connected to a suitable source of steam supply and is also provided with a discharge pipe 41. Tanks 20 and 21 are preferably provided with suitable gauges 42 and 43 which are illustrated as the ordinary glass tube type. The tank 20 is also provided with a discharge or drain pipe 44 controlled by valve 45. The pipes 23 and 27, preferably, are provided with suitable air cocks 49.

In operation, when it is desired to clean one of the gear casings of the automobile, such as a differential gear casing on the rear axle housing, the automobile will be driven onto the platform 1 and the rear wheels disposed on the rollers 3 and 4. These rollers then form the sole support for said wheels. Conduits 17 and 18 are then connected to the gear casing and the engine of the automobile started so that the rear wheels are driven. When both wheels are used for driving the apparatus a cross belt 10 is used. This belt acts to turn one of the pulleys 5 and rollers 4 in reverse direction to the other pulley 5 and roller 4 and thus tends to turn one of the wheels 16 rearward. This action gives more resistance to the wheel 16 so that a good driving effect is obtained with no tendency for the automobile to run forward off of the rollers 4. With the structure described using the cross belt it may be stated that the belt with its pulley 4 acts as a brake on one of the wheels 16 and slippage occurs in said belt. Rollers 3 will thus be rotated and power communicated therefrom through the belts 9 and 10 to the shaft 7. If both rear wheels are used to drive the shaft 7 the speed of said shaft will be much less than if only one wheel is used to drive said shaft and, in practice, it has been found preferable to use merely one of the rear wheels of the automobile for driving. When this is done, the belt 10 can be thrown from its pulley 5 and rollers 3 and 4 and the rollers 3 and 4 at that side of the machine held in stationary position by the brake member 46. The engine of the automobile and the rear wheels being driven as stated, power will be transmitted to the compressor 14. It is desired to have a certain supply of cleaning fluid, such as kerosene, in the tank or compartment 20. The compressor can be used to fill this tank, if desired, by turning the valve 26 so as to close pipe 23, turn valve 29 so that pipe 27 communicates with pipe 28 in the open end of tank 20. Valve 45, at this time, of course, will be closed and valve 34 turned so that pipe 30 is closed. Valve 38 is now opened and the pipe 37 connected in any convenient manner with a supply of kerosene. This kerosene will then be drawn into the tank or compartment 20 by the suction through pipe 27 until a sufficient supply is obtained therein, the discharge from the compressor passing out of vent cock 49 in pipe 23. It has been found in practice that about five gallons of kerosene is necessary to clean the ordinary gear casing, although, of course, this amount can be varied, as desired.

After the necessary amount of kerosene is delivered into the tank 20, valve 29 is turned so that pipe 27 communicates directly with the top of tank 21 and valve 26 is turned so that pipe 23 communicates with the top of tank 20 through the pipe 24. Valve 38 is now closed and pipe 36 then connected directly with conduit 17. The valve 34 is turned so that the upper part of pipe 30 communicates with pipe 33, which pipe is then directly in communication with conduit 18. Steam is now preferably supplied to the heating coil 39 so that the kerosene in tank 30 will be heated. The compressor 14 now being operated from the wheel 16 of the automobile, air will be pumped into the top of tank 20 through pipe 24 and air will be exhausted from the top of the tank 21 down to the compressor through pipe 27. The pressure created in tank 20 will force the kerosene therefrom out through pipe 36 and through conduit 17 into the gear casing 15ª. This kerosene will be forcibly projected into the gear casing and will be splashed and distributed therein by the moving gears and will then be drawn from the gear casing by the suction produced in conduit 18 so that the kerosene will pass through said conduit into pipe 33 and will be delivered through the upper portion of pipe 30 into tank or compartment 21. This operation will be continued until the kerosene or cleaning fluid is practically exhausted from tank 20. When this amount of such cleaning fluid has been passed through the gear casing, the casing will be cleaned.

The valve 26 is now turned so that pipe 24 is closed and pipe 23 connected to pipe 25. Valve 29 is now turned so that pipe 27 is connected to pipe 28 and valve 34 is turned so that pipe 33 is closed and pipe 30 open from top to bottom. The compressor 14 now being further operated, air will be forced under pressure into the top of tank 21 while suction will be produced through pipe 27 in the top of tank 20. Kerosene or other cleaning fluid will now pass from tank 21 through pipe 30 into tank 20. The same passes into member 31 and through the screen 32 so that any lumps of grease or other solid matter therein will be strained therefrom and will drop into the bottom of member 31 and into the enlarged portion at the bottom thereof. The tank 21 is thus emptied and the cleaning fluid again placed in tank 20 so that the cleaning operation for the gear casing above described can again be repeated. After the cleaning fluid has been run through the gear casing the conduits 17 and 18 will be disconnected and a new charge of grease can be placed in the gear casing. The gear casing will then be closed by the usual plugs inserted into the tapped holes therein.

While the automobile wheel is revolving on the rollers 3 and 4, the latter will be revolved and it will be impossible for the wheel to ride off from these rollers as long as the same are freely revoluble. In order to permit the automobile to move off the platform brake member 46 is applied to the rollers. The automobile can then be driven from the platform and is again ready for operation.

The amount of fluid in tanks 20 and 21 can at all times readily be observed through the glass tubes or casings 42 and 43. The vent cocks 49 can be opened at suitable periods to relieve any pressure or partial vacuum which may be formed in the pipes 23 and 27. The tank 20 can be drained when desired through pipe 44.

In the modification shown in Fig. 4, two separate tanks 50 and 51 are shown, to the tops of which are connected pipes 52 and 53, respectively. Pipe 52 will be connected to the discharge side of an air pump or compressor such as shown at 14 and the pipe 52 will be connected to the intake side thereof. Three-way valves 54, 55, 56 and 57 are disposed in the pipes 52 and 53 and valves 54 and 56 are connected by a cross pipe 58, while valves 55 and 57 are connected by a cross pipe 59. A pipe 60 leads from the bottom of tank 50 which will be connected to conduit 17 and a pipe 61 communicates with tank 51 which will be connected to conduit 18.

In the operation of the device shown in Fig. 4, a suitable supply of cleaning fluid will be placed in tank 50. Valves 54 and 57 will be turned to provide a straight passage through pipe 62 and close pipes 58 and 59, and valves 55 and 56 will be turned to open pipe 53 and close pipes 58 and 59. The compressor being driven, preferably, by the means above described, air under pressure will be forced into top of tank 50 and the cleaning fluid therein will be forced out through pipe 60 into conduit 17 through the gear casing and the same will be drawn through conduit 18 and pipe 61 into tank 51 by the suction exerted through pipe 53. After the cleaning fluid has thus been all passed through the gear casing from tank 50 and tank 51, valves 57 will be turned to close the top portion of pipe 52 and connect pipe 59 to the lower portion thereof and valve 55 will be turned so as to connect the top portion of pipe 53 with pipe 59 to close off the lower portion of pipe 53. Valve 56 will be turned to connect the lower portion of pipe 53 with pipe 58 and valve 54 will be turned to connect the upper portion of pipe 52 and pipe 58. The compressor now being operated, air will be forced from pipe 52 through pipe 59 and the upper portion of pipe 53 into tank 51 and air will be drawn from the top of tank 50 through the upper portion of pipe 52 through pipe 58 and the lower portion of pipe 53. The kerosene may then be forced from tank 51 back into tank 50 through a connecting pipe (not shown) which may be a flexible hose.

From the above description it is seen that applicant has provided a very simple and efficient means for cleaning the gear casing of an automobile. It has been found in practice that the desired amount of cleaning fluid can be passed through the gear casing and the same cleaned in the short interval of ten minutes. This is a great advance over the prior means of disassembling the casing in order to remove the old grease therefrom. By driving the apparatus from the wheel of the automobile, the necessity for a separate power unit for the apparatus is eliminated and the gear casing is more effectively cleaned by having the parts therein moving during the cleaning operation. As described, the cleaning fluid is strained and can be repeatedly used and the cleaning fluid can be charged into the supply tank by the apparatus itself. The entire apparatus comprises few parts and the same is easily and inexpensively produced. The apparatus has been successfully used in actual practice and its efficiency thoroughly demonstrated. While the device is usually used to clean the gear casing or the universal joint casing, it can also be used to clean the crank casings and transmission casings. These latter casings, however, do not need such frequent cleaning as oil is usually contained therein which is constantly agitated by the moving parts.

It will, of course, be understood, that various changes may be made in the form, details, arrangement and proportion of the parts without departing from the scope of applicant's invention, which, generally stated, consists in a device capable of carrying out the objects above stated, such as shown and described and set forth in the appended claims.

What is claimed is:

1. A cleaning device for the gear casings of automobiles having in combination, a tank adapted to contain a quantity of cleaning fluid, a tank adjacent said tank, a conduit connected to said first mentioned tank and adapted to be connected to the gear casing of an automobile, a conduit connected to the second mentioned tank and adapted to be connected to said gear casing, and means connected to both tanks for forcing said cleaning fluid from said first mentioned tank through said first mentioned conduit into said gear casing, and simultaneously producing a vacuum in said second mentioned tank to draw said cleaning fluid from said gear casing into said second mentioned tank.

2. A device for cleaning the gear casing of an automobile having in combination, a pressure tank containing a cleaning fluid, a conduit communicating with said tank and connected to said casing, a vacuum tank, a conduit communicating with said vacuum tank and connected to said casing, means for creating a pressure in said pressure tank and a vacuum in said vacuum tank, and power means for driving said last mentioned means and the parts in said gear casing whereby said cleaning fluid will be circulated through said casing while the parts therein are in motion and said fluid will be forced from said pressure tank into said gear casing and drawn therefrom into said vacuum tank.

3. A device for cleaning a gear casing of an automobile having in combination, a pressure tank adapted to contain cleaning fluid, a conduit connected to said tank and to said gear casing, a suction tank, a conduit connected with said suction tank and to said gear casing, an air compressor connected to said pressure tank for creating a pressure therein and also connected to said suction tank for creating a suction therein, and power means for operating said compressor whereby the cleaning fluid contained in said pressure tank will be forced into said gear casing and will be drawn from said gear casing into said suction tank.

4. The structure set forth in claim 3, a conduit connecting said pressure tank and said suction tank and connections from said tanks to said air compressor for producing pressure in said suction tank and suction in said pressure tank whereby the cleaning fluid which has been drawn into said suction tank may be forced therefrom and again drawn into said pressure tank.

5. A device for cleaning the gear casing of an automobile comprising a tank having a pressure compartment adapted to contain cleaning fluid and a suction compartment, an air compressor, a conduit connected to the inlet of said compressor and said suction compartment, a conduit connected to the outlet of said compressor and to said pressure compartment, a conduit extending from said pressure compartment to the gear casing, a conduit extending from said suction compartment to the gear casing, means for operating said compressor whereby a cleaning fluid may be forced from said pressure compartment into said casing and drawn from said casing into said suction compartment, a conduit connecting the pressure compartment to the said conduit which is connected to the inlet of the compressor, a conduit connecting the suction compartment to said conduit which is connected to the outlet of said compressor, valves for controlling said last two mentioned conduits, a conduit connecting the suction compartment to the pressure compartment, whereby the cleaning fluid, after being returned to the suction compartment can again be forced therefrom and drawn into the pressure compartment.

In testimony whereof I affix my signature.

EDWIN C. ANDERSON.